(12) United States Patent
Zutz et al.

(10) Patent No.: US 11,009,851 B2
(45) Date of Patent: May 18, 2021

(54) DRIVE CONTROLLER AND DRIVE SYSTEM

(71) Applicant: BECKHOFF AUTOMATION GMBH, Verl (DE)

(72) Inventors: Robert Zutz, Verl (DE); Oliver Ellerbrock, Vlotho (DE); Holger Buettner, Berlin (DE)

(73) Assignee: Beckhoff Automation GmbH, Verl (DE)

( * ) Notice: Subject to any disclaimer, the term of this patent is extended or adjusted under 35 U.S.C. 154(b) by 245 days.

(21) Appl. No.: 16/408,115

(22) Filed: May 9, 2019

(65) Prior Publication Data

US 2019/0265675 A1 Aug. 29, 2019

Related U.S. Application Data

(63) Continuation of application No. PCT/EP2017/079122, filed on Nov. 14, 2017.

(30) Foreign Application Priority Data

Nov. 18, 2016 (DE) ..................... 10 2016 122 259.3

(51) Int. Cl.
*G05B 19/4063* (2006.01)
*G05B 19/408* (2006.01)
(Continued)

(52) U.S. Cl.
CPC ..... *G05B 19/4063* (2013.01); *G05B 19/4083* (2013.01); *H02H 7/093* (2013.01);
(Continued)

(58) Field of Classification Search
CPC ........................ G05B 19/4063; H02P 29/0241
(Continued)

(56) References Cited

U.S. PATENT DOCUMENTS 6,650,078 B1 * 11/2003 Chaffee ................ G05B 13/024
318/560
8,433,831 B2 4/2013 Ost et al.

FOREIGN PATENT DOCUMENTS

DE      10261452 A1    9/2004
DE      102007015205 A1    10/2008
DE      102009038060 A1    3/2011

OTHER PUBLICATIONS

Beckhoff, "AX5805 / AX5806 User Manual", Version 1.7.0, Mar. 16, 2017, 112 Pages.
(Continued)

*Primary Examiner* — David Luo
(74) *Attorney, Agent, or Firm* — Dorsey & Whitney LLP

(57) ABSTRACT

A drive controller comprises an evaluation unit to receive and evaluate a first item of feedback information from a motor connected to the drive controller, a control-signal block connected to secure inputs of the drive controller to receive condition control signals and to provide the condition control signals as input signals, a drive-signal block connected to the evaluation unit to calculate a first speed and/or a first position on the basis of the first item of feedback information on at least a first channel and to provide a first speed signal and/or a first position signal, a programmable logic unit connected to the control-signal block and the drive-signal block to realize the safety functions and the speed signal and/or the position signal to provide switch-off signals, and an output unit connected to the logic unit and to secure outputs of the drive controller to output switch-off signals on safety-switch-off paths.

20 Claims, 2 Drawing Sheets

(51) Int. Cl.
    *H02P 29/024*    (2016.01)
    *H02H 7/093*     (2006.01)
    *H02P 29/00*     (2016.01)

(52) U.S. Cl.
    CPC .......... *H02P 29/00* (2013.01); *H02P 29/0241* (2016.02); *G05B 2219/41329* (2013.01)

(58) Field of Classification Search
    USPC ................................................ 318/567, 560
    See application file for complete search history.

(56)         References Cited

OTHER PUBLICATIONS

Beckhoff, "AX5805 / AX5806 User Manual", with English Abstract Version 1.6.1, Mar. 15, 2016, 113 Pages.
Siemens AG, Function Manual SINAMICS S120 Safety Integrated , Jul. 1, 2017, pp. 1-132, XP055440212.

\* cited by examiner

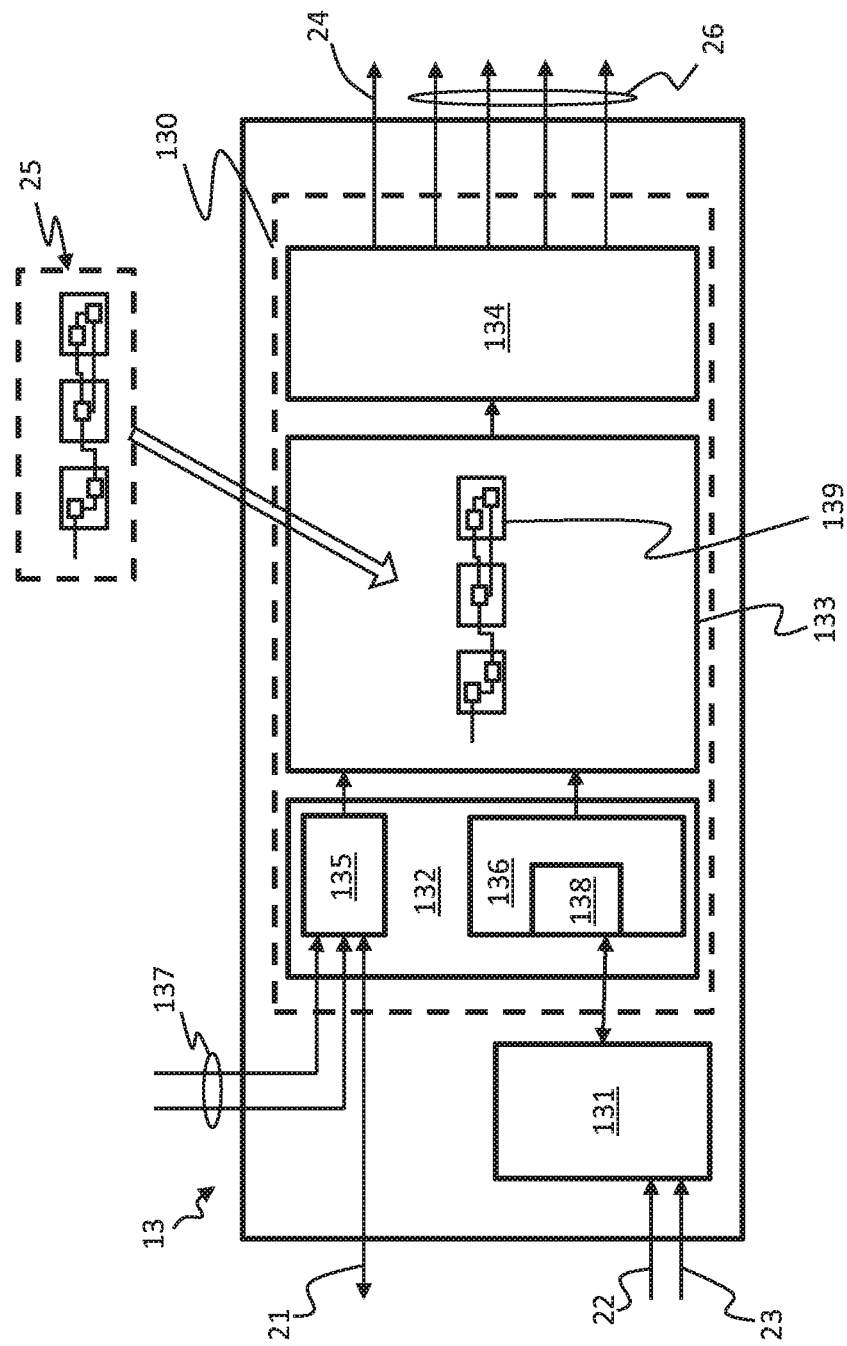

DRIVE CONTROLLER AND DRIVE SYSTEM

CROSS-REFERENCE TO RELATED APPLICATIONS

This application is a continuation of PCT Application No. PCT/EP2017/079122, filed Nov. 14, 2017, which claims priority to German Patent Application DE 10 2016 122 259.3, filed Nov. 18, 2016, entitled SICHERHEITSEIN-RICHTUNG FUR EINEN ANTRIEBSREGLER, each of which is incorporated by reference herein, in the entirety and for all purposes.

FIELD

The present invention relates to a drive controller and to a drive system.

BACKGROUND

Drive units usually consist of a motor, of a power electronics and of a drive controller. The power electronics supplies the motor with the current necessary to sustain motion. From the signals of a sensor at the motor, the drive controller determines speed and position of the motor and carries out speed and position control by a corresponding activation of the power electronics. A safety brake in the motor which is usually provided furthermore serves to maintain the position of the motor even in a power-off state, e.g. after switching off the machine.

Increasingly, a safety device having safety functions is integrated into the drive controller, e.g. as a plug-in card. Any essential danger of body injury that may occur at the machines results from the dynamic motion of the drive unit. Integrating the safety device having safety functions into the drive controller allows for short response times compared to an external safety controller. The safety device having the safety functions in the drive controller serves to switch the motor in a torque-free manner and to monitor speed and position. Moreover, the safety device usually controls the safety brake in the motor, as well.

Each desired safety function is firmly stored in the safety device of the drive controller and may be activated by parameterizing. Therefore, the functionalities of the safety functions are predetermined. As a result, the safety functions are limited to the developmental state of the safety device at the point in time when it was integrated into the drive controller.

Moreover, the time and effort involved in implementation is high as every safety function in the safety device has to be fully programmed. Testing, too, takes up additional time as the safety functions have to be fully tested with many different parameterizations.

In addition, it is not possible for the user to extend the safety functions; this may only be done on behalf of the manufacturer by changing the software in the safety device. Moreover, executing the safety functions in the drive controller requires a lot of time as the safety functions that are available always have to be run through, even if they are currently not utilized by the user.

A generic safety device of a drive controller is disclosed in DE 102 61 452 A1. DE 10 2009 938 060 A1 further discloses a validity check of two measured values in a drive unit.

SUMMARY

The present invention provides an improved drive controller and an improved drive system that allows for a simple implementation and extension of the safety functions.

EXAMPLES

According to a first aspect, a drive controller comprises an evaluation unit being configured to receive and evaluate a first item of feedback information from a motor connected to the drive controller, a control-signal block connected to secure inputs of the drive controller and being configured to receive condition control signals via the secure inputs and to provide the condition control signals as input signals, a drive-signal block connected to the evaluation unit and being configured to calculate a first speed and/or a first position on the basis of the first item of feedback information on at least a first channel and to provide a first speed signal and/or a first position signal, a programmable logic unit connected to the control-signal block and to the drive-signal block and being configured realizes the safety functions on the basis of the input signals and the speed signal and/or the position signal in order to provide switch-off signals, and an output unit that is connected to the logic unit and to secure outputs of the drive controller and being configured to output switch-off signals on safety-switch-off paths of the drive controller. The programmable logic unit comprises the logic modules that were edited by a safety editor and loaded onto the logic unit, wherein a stop function, a speed function, a positional function, an accelerating function and/or a direction-of-rotation function that are each assembled from the logic modules.

According to a second aspect, a drive controller comprises an evaluation unit being configured to receive and evaluate a first item and a second item of feedback information from a motor connected to the drive controller, a drive-signal block connected to the evaluation unit and being configured to calculate a first speed and/or a first position on the basis of the first item of feedback information on a first channel and provide a first speed signal and/or a first position signal and to calculate a second speed and/or a second position on the basis of the second item of feedback information and provide a second speed signal and/or a second position signal, and a test-signal module being configured to carry out a validity check of the calculated first and second speed and/or of the first and second position of the two-channel drive-signal block in order to examine whether the drive controller is in a valid state.

According to a third aspect, a drive system comprises a motor, a drive controller and a superordinate safety controller. A data-transmission medium having a safety-oriented protocol connects the drive controller to the superordinate safety controller. The drive controller comprises an evaluation unit being configured to receive and to evaluate a first item of feedback information from the motor connected to the drive controller, an input unit which comprises a control-signal block connected to secure inputs of the drive controller an being configured to receive condition control signals from the superordinate safety controller via the secure inputs and to provide the control signals as input signals, and a drive-signal block connected to the evaluation unit and being configured to calculate a first speed and/or a first position on the basis of the first item of feedback information on at least a first channel and to provide a first speed signal and/or a first position signal, a programmable logic unit connected to the control-signal block and to the drive-signal block of the input unit and being configured to realize safety functions on the basis of the input signals and the speed signal and/or the position signal in order to provide switch-off signals, and an output unit that is connected to the logic unit and to the secure outputs of the drive controller and being configured to output switch-off signals on safety-switch-off paths of the drive controller. The superordinate safety controller comprises a safety editor, wherein logic modules present in a programming environment are edited by the safety editor, and wherein the safety functions are a stop function, a speed function, a positional function, an accelerating function and/or a direction-of-rotation function that are each assembled from the logic modules. The programmable logic unit comprises the logic modules that were edited by the safety editor and loaded onto the logic unit.

A safety device for a drive controller comprises an input unit that comprises a control-signal block connected to secure inputs of the drive controller in order to condition the control signals received via the secure inputs and to provide the control signals as input signals, and a drive-signal block connected to the evaluation unit of the drive controller in order to calculate a first speed and/or a first position on the basis of a first item of feedback information from a motor connected to the drive controller on at least a first channel, and to provide a first speed signal and/or a first position signal. A programmable logic unit of the safety device is connected to the control-signal block and to the drive-signal block of the input unit and comprises logic modules that realize safety functions on the basis of the input signals and of the speed signal and/or of the position signal in order to provide switch-off signals. Furthermore, the safety device comprises an output unit connected to the logic unit and with secure outputs of the drive controller in order to output the switch-off signals onto safety-switch-off paths of the drive controller.

The present modular concept safety functions may be realized in a drive controller. In this context, the safety device, configured as hardware and/or as software, consists of three logic parts; i.e. the input unit, the logic unit and the output unit. A simple and generic implementation of the safety functions is allowed for by the manufacturer. The safety functions may be assembled from the logic modules of the logic unit in a simple and flexible manner. The logic modules are e.g. present in the programming environment and the user may then assemble any desired safety function from the logic modules and load it onto the logic unit. Moreover, the user may extend the safety functions without the time and effort involved in a subsequent certification by the manufacturer or by a testing authority responsible for that. The safety device may further be adapted to any desired application demands.

The drive-signal block of the safety device may further comprise a second channel in order to calculate a second speed and/or a second position on the basis of a second item of feedback information from the motor connected to the drive controller, and to provide a second speed signal and/or a second position signal. The first item of feedback information for the drive-signal block of the safety device may in this context be a sensor signal from the motor and the second item of feedback information may be an activation signal for the motor. By a two-channel calculation of speed and/or position of the motor, it may be ascertained in a simple manner by comparing the values whether the drive controller is in a valid state.

The two-channel drive-signal block of the safety device may comprise a test-signal module that carries out a validity check of the calculated first and second speed and/or the first and second position in order to examine whether the drive controller is in a valid state. As an alternative, the logic unit of the safety device may comprise a test-signal module carrying out a validity check of the calculated first and second speed and/or of the first and second position of the two-channel drive-signal block in order to examine whether the drive controller is in a valid state.

The safety functions executable by the safety device may be a stop function, a speed function, a positional function, an accelerating function, a torque function and/or a direction-of-rotation function. No or only little limits exist with regard to the safety functions that may be implemented.

A drive controller may be equipped with such a safety device. The safety device may be configured as a plug-in card for the drive controller. The drive controller may thus be retrofitted in a simple manner.

The drive unit may be part of a drive system having a motor, of a power electronics and of a safety brake. The output unit of the safety device may comprise an output for the safety brake. The drive system may furthermore be connected with a superordinate safety control via a data-transmission medium wherein the data-transmission medium is operated with a safety-oriented protocol in order to allow for data exchange between the logic unit of the safety device in the drive controller and the superordinate safety controller. The logic unit of the safety device is configured to communicate with a superordinate safety controller and to exchange data via a safety-oriented protocol. The safety device of the drive controller may thus be integrated into a system controls within the framework of a production and manufacturing process without any additional wiring.

BRIEF DESCRIPTION OF THE DRAWINGS

The present invention will be explained in more detail in conjunction with the accompanying drawings.

FIG. 2 depicts a simplified diagram of a drive controller having a safety device.

DETAILED DESCRIPTION

Figure 1:
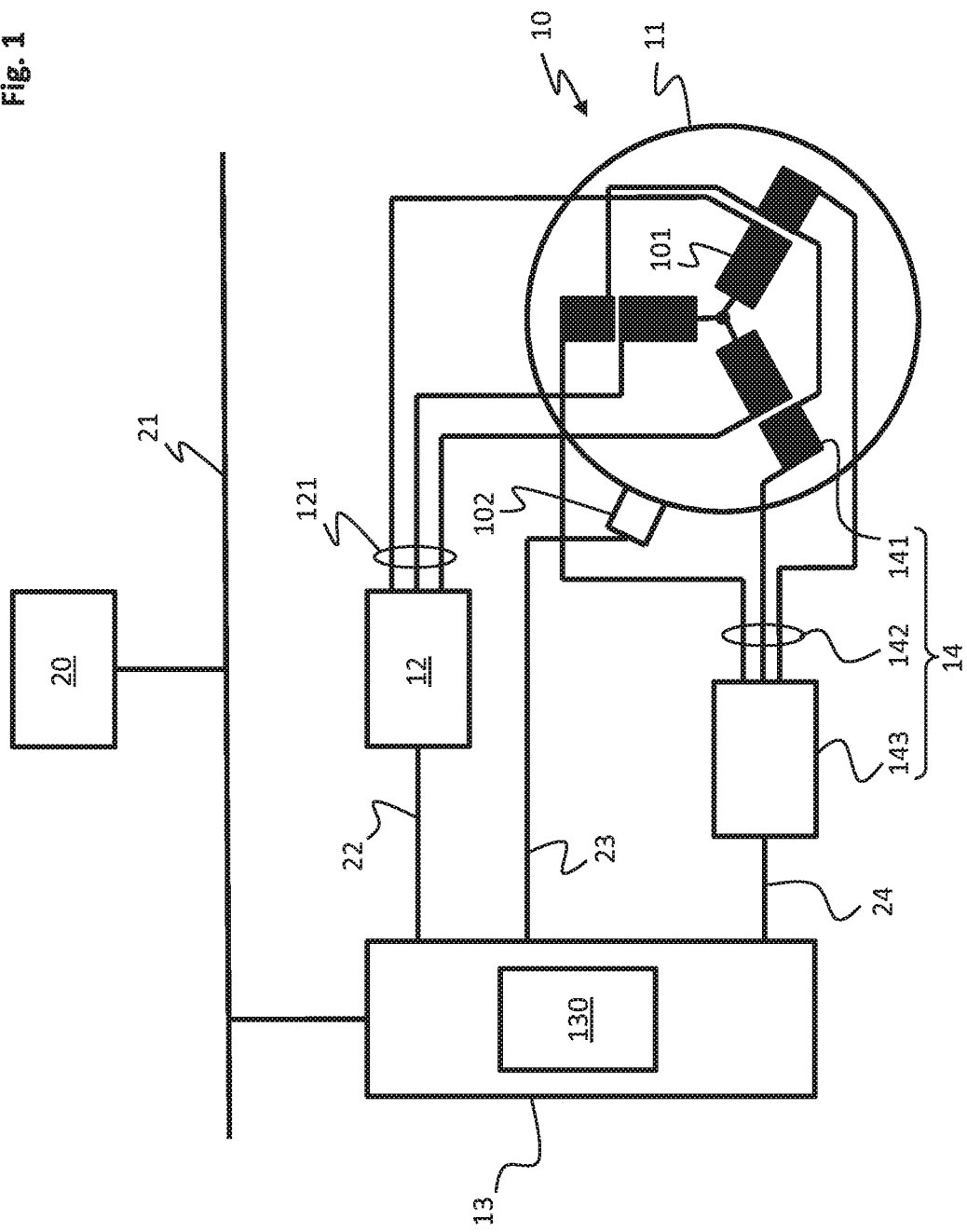
FIG. 1 schematically shows a drive system having a drive unit comprising an electric motor and a safety brake, and with a superordinate safety controller.

Drive units with motors are used in automation technology in order to put machines into motion, e.g. packaging machines, machine tools, forming machines, transport systems or robots. In order to guarantee safe operation of such drive units, movements that may be a safety risk have to be effectively avoided. A safety risk may be any kind of danger for operating or maintenance staff or a movement that leads to machine damage, e.g. an unbraked driving against a stop.

In order to prevent movements that may be a safety risk, safety functions are implemented in the controller of the drive units. For embodying the safety controller in the drive units, provisions exist in the form of standards. Standard EN 61508, for example, comprises guidelines for evaluating functional safety of electrical, electronical or program-controlled systems. The EN ISO 13849 standard provides design guidelines for safety-related components of machine controls. The demands with regard to the functional safety of electrical power-drive systems with adjustable engine speed, for instance for electric motors, are specified in the EN 61800-5-2 standard. The EN 61800-5-2 standard also describes safety functions for safe operation of such drive units, e.g. safe operating stop or Safe Torque Off.

Furthermore, safety brakes are implemented in the drive units that support the operating stop of the motor during switch-off in order to prevent coasting down of the motor. The safety brake serves to maintain the position of the motor even in a power-off state of the machine.

For controlling the drive unit, a drive controller is used that controls the power electronics generating the voltages and currents necessary for motor operation. In order to be able to carry out a control of the central safety functions near to the drive, the drive controller integrates a safety device comprising the safety functions e.g. in the form of a plug-in card. The safety device having the safety functions in the drive controller serves to switch the motor in a torque-free manner and to monitor speed and position as well as to activate the safety brake.

The safety device with the safety functions is embodied in a modular manner in the drive controller. In this context, the safety device which is embodied as hardware and/or software consists of three logic components, i.e. an input unit, a logic unit and an output unit.

The input unit comprises two blocks. A control-signal block of the input unit may provide existing secure inputs, such as hardware inputs on the drive controller or feedback information from the safety brake of the logic unit.

A drive-signal block calculates a speed and/or a position on at least one first channel on the basis of an item of feedback information, e.g. form a sensor installed at the motor. The drive-signal block may further calculate the speed and/or the position on a second channel on the basis of a further item of feedback information, e.g. an activating signal for the motor. The calculated values are forwarded to the logic module.

Optionally, the two-channel drive-signal block may comprise a test-signal module that carries out a validity check of the values of the two channels of the drive-signal block. By the validity check of the values, it is examined whether the drive controller is in a valid state. If such a validity check is activated, the information whether the evaluation of the validity check was successful is transmitted from the test-signal module of the drive-signal block to the logic unit in addition to the values of the two channels of the drive-signal block.

The logic unit of the safety device comprises logic modules that may be freely programmed, wherein the logic modules may be edited by a safety editor and loaded onto the logic unit. By the available logic modules, the user may realize the safety functions on the basis of the safety standards such as IEC 61508 or DIN EN 61800-5-2 and adapt them to the respective purpose. The safety functions executable by the safety device may be a stop function, a speed function, a positional function, an accelerating function and/or a direction-of-rotation function. No or only little limitations exist with regard to the implementable safety functions. The individual safety functions may in this context be assembled from a plurality of simple logic modules and loaded onto the logic unit in a simple manner. The logic modules are e.g. present in the programming environment and the users may assemble their desired safety functions from the logic modules and load them onto the logic unit.

In this manner, e.g. a restart lock or a monitoring system for switch-off ramps may be implemented in the logic unit. If the validity check of the values of the two channels of the drive-signal block by a test-signal module has not been carried out in the drive-signal block, it is realized within the logic unit by a test-signal module. Moreover, a restart lock—as well as e.g. a monitoring system for switch-off ramps—is implemented in the logic unit.

Optionally, the logic unit may communicate with a superordinate safety controller and exchange data via a safety-oriented protocol. As an alternative, the logic unit may also operate as a stand-alone system and e.g. read in the secure inputs and set the secure outputs directly therefrom.

The output unit of the safety device operates and tests safety-switch-off paths of the drive controller. Furthermore, outputs for e.g. the safety brake are provided at the output unit. The output unit receives items of information from the logic unit whether to switch on or off.

A simple and generic implementation of the safety functions on behalf of the manufacturer is provided; moreover, the possibility of extending the safety functions by the user without requiring subsequent certification by the manufacturer or a testing authority responsible therefore. The safety device may furthermore be adapted to any desired user demands.

In the following, an embodiment of a drive system is described in conjunction with FIG. 1 as well as an embodiment of a drive controller with a safety device in conjunction with FIG. 2.

FIG. 1 shows a drive system having a drive unit 10 which comprises a motor, a power electronics 12 and a drive controller 13. In the shown embodiment, the motor is an electric motor 11 comprising a drive-coil system 101 that is charged by the power electronics 12 via an electrical drive-conductor bundle 121 by drive signals such as controlled voltage and current signals.

The drive-coil system 101 may e.g. be arranged at a stator of the electric motor 11. The drive signals generate a magnetic field in the drive-coil system 101 which sets the electric motor 11 in motion by interacting with a magnetic element of the electric motor 11, e.g. a permanent magnet or an excitation system comprising coils. Provided that the drive-coil system 101 is arranged at the stator of the electric motor 11, the magnetic element may e.g. be arranged at a moveable rotor of the electric motor 11. Alternatively, it is possible, as well, to arrange the drive-coil system 101 at a rotor or to arrange the magnetic element at the stator.

The electric motor 11 may be a rotary-field and travelling-field machine. In particular, the electric motor 11 may be a three-phase motor, as indicated in FIG. 1. However, the electric motor may also be a linear motor. Alternatively, the electric motor 11 may be embodied as a commutator machine.

The control of the electric motor 11 is carried out by the drive controller 13 which is connected to the power electronics 12 via a power-electronics-control line 22. The drive controller 13 may e.g. carry out a pulse-width modulation of the drive signals in the power electronics 12 by the control signals. In this context, the pulse-duty factor of a periodic rectangular-impulse signal is varied in order to vary the speed and the torque of the electric motor 11. If the electric motor is a three-phase motor, the drive signals at the drive coils are modulated in such a way that the required rotary field is in an average period of time generated for the drive of the electric motor 11.

At the electric motor 11, a sensor 102 is arranged which detects a motion of the electric motor 11 and transmits a sensor signal representing the motion to the drive controller 13 via a sensor line 23. The feedback of the motion of the electric motor 11 to the drive controller 13 allows for controlling the motion of the electric motor via a closed control loop.

The sensor 102 is chosen depending on the type of motor and application. For an electric motor 11, a speed sensor is usually provided which may e.g. be embodied as a resolver, an incremental encoder or an absolute encoder. The drive controller 13 compares the signal of the sensor 102 to a predetermined desired value for position and/or speed. In case a deviation is detected, torque and/or speed are readjusted. The sensor 102 may comprise a plurality of sensors in order to detect various quantities at the electric motor 11 and to feed these back to the drive controller 13 as signals.

The electric motor 11 comprises an additional coil system 141 as a part of the safety brake 14 that is magnetically coupled to the drive-coil system 101. The additional coil system 141 is connected to the safety-brake unit 143 via an electrical brake-line bundle 142 that is at the same time a part of the safety brake 14. The controller of the safety brake 14 is carried out by the drive controller 13 which is connected to the safety brake 14 via a safety-brake-control line 24.

The electrical safety brake 14, however, may also be integrated into the electric motor 11 or the power electronics 12 in a different manner. Alternatively, the safety brake may be implemented as a mechanical operating and holding brake that decelerates the electric motor 11 and keeps it in position after switch-off of the power electronics 12.

The drive controller 13 comprises a safety device 130 that controls the functions of the drive controller 13 that are relevant for the functional safety of the drive system. This may e.g. be a monitoring of the motion of the electric motor 11 by the sensor 102. If a safety-relevant error occurs, the safety device 130 may block the power electronics 12 and switch the electric motor in a torque-free manner. Furthermore, the safety device 130 of the drive controller 13 may trigger the safety brake 14.

The drive system is furthermore connected to a superordinate safety controller 20 via a data-transmission line 21. The superordinate safety controller 20 may carry out further safety-relevant control functions in the drive system via the safety device 130 in the drive controller 13. For this purpose, the superordinate safety controller 20 may comprise specific secure hardware and software which is e.g. embodied redundantly. Apart from safety-relevant control functions, the superordinate safety controller 20 may furthermore carry out normal control functions.

By the data-transmission line 21, the superordinate safety controller 20 may exchange communication data with the drive controller 13 or, respectively, with the safety device 130 in the drive controller 13. The communication data may comprise measuring values, status reports and control commands which are required in order to carry out safety-relevant or, respectively, normal control functions. The data-transmission line 21 may be a network cable, e.g. an Ethernet cable. Communication may e.g. be based on the EtherCAT standard.

"Safety over EtherCAT" (Fail Safe over EtherCAT, FSoE) may e.g. be used as a secure data-transmission protocol, as described in the IEC 61784-3-12 standard. The use of the FSoE data-transmission protocol allows for secure transmission of communication data that is solely based on safety features (such as check sums or sequence counters) of the data-transmission protocol itself and not on a safeguarding of the data-transmission line on a physical level.

FIG. 2 shows a drive controller 13 comprising the safety controller 130 in a simplified diagram. The safety circuit 130 may be embodied as a plug-in card which is inserted into a corresponding slot in the drive controller 13. The safety controller 130, however, may also be configured as hardware in the drive controller 130 itself, e.g. as an application-specific integrated circuit. The safety device 130 may, however, also be integrated as software on a processor in the drive controller 13.

FIG. 2 shows an evaluation unit 131 as a component of the drive controller 13 beside the safety device 130, the evaluation unit comprising a motor model of the motor coupled to the drive controller 13. Furthermore, the inputs and outputs necessary for the safety device 130 in the drive controller 13 are shown. The drive controller 13, however, comprises further components or, respectively, circuits such as inputs and outputs for controlling the drive or, respectively, for communicating with further connected devices.

The safety device 130 consists of an input unit 132, a logic unit 133 and an output unit 134. The units themselves may be embodied as stand-alone hardware units or as components of an integrated circuit. Moreover, the units may be implemented on a processor as software.

The input unit 132 comprises a control-signal block 135 and a drive-signal block 136. The control-signal block 135 is connected to secure inputs 137 of the drive controller 13 in order to detect control signals received by the drive controller 13 via secure inputs. In FIG. 2, two secure inputs 137 are shown at the drive controller 13. However, further secure inputs may be provided.

The control-signal block 135 is furthermore connected to a data-transmission line 21 via the corresponding terminal at the drive controller 13 in order to be able to exchange communication data with the superordinate safety controller 20. The control-signal block 135 conditions the control signals received via the secure inputs 137 which may e.g. be items of feedback information from the safety brake, as well as the communication data from the superordinate safety controller 20 and provides them to the logic unit 133 as input signals.

The evaluation unit 131 of the drive controller 13 is connected to the feedback devices of the motor in order to receive and evaluate feedback information. Two feedback inputs are depicted in the embodiment shown in FIG. 2. One feedback input is in this context connected to the sensor line 23 in order to receive the sensor signal. The other feedback input is connected to the power electronics control line 22 in order to receive activating signals for the motor.

The two items of feedback information are fed into the drive-signal block 136 of the input unit 132 in the safety device 130 by the evaluation unit 131. On the basis of the two items of feedback information, the drive-signal block 136 respectively calculates a speed and/or a position of the motor. The two calculated speed and/or position values are forwarded to the logic unit 133 by the drive-signal block 136.

The drive-signal block 136 further comprises a test-signal module 138 which additionally carries out a validity check of the two speed and/or position values determined via the first and second calculation channel in the drive-signal block in order to examine whether the drive controller 13 is in a valid state. The validity signal is transmitted to the logic unit 133 in addition to the two speed and/or position values.

Alternatively, however, the validity check may be carried out in the logic unit 133. The logic unit then comprises a test-signal module that receives and compares the two speed and/or position signals in order to determine a validity signal.

Apart from such a possible test-signal module, the logic unit 133 comprises further freely programmable logic modules 139 which define the safety functions. The safety functions may e.g. be a stop function, a speed function, a positional function, an accelerating function, a torque function and/or a direction-of-rotation function.

The logic modules are e.g. present in the programming environment and the user may assemble the desired safety functions from the logic modules and load them onto the logic unit.

The safety functions may be edited via a safety editor 25 schematically shown in FIG. 2 and may be stored in the programmable logic modules 139 of the logic unit 133. The safety editor 25 may in this context e.g. be a part of the superordinate safety controller 20. Loading the programmed safety functions into the logic modules 139 of the logic unit 133 may then be carried out via the data-transmission line 21.

The logic unit 133 then carries out the safety functions programmed into the logic modules 139 with the calculated speed-signal and/or position-signal values. This may e.g. be monitoring acceleration, position, speed, torque and/or direction of rotation of the motor. Moreover, the logic unit 133 evaluates the validity signal resulting from the validity check.

The logic unit 133 then generates control signals for the safety devices at the motor, such as the safety brake 14 or the power electronics 12. The control signals are transmitted to the output unit 134 of the safety device 130 by the logic unit 133. The safety-switch-off paths 26 of the drive controller are coupled to the output unit 134. In FIG. 2, four safety-switch-off paths 26 are shown which are tested by the output unit 134 of the safety device 130 and charged with the control signals of the logic unit 133.

Furthermore, the output unit 134 is connected to the safety-brake-control line 24 in order to address the safety brake 14 on the basis of the corresponding control signal of the logic unit 133. Further secure outputs of the drive controller 13 may be coupled to the output unit 134 in order to output control signals of the logic unit 133 of the safety unit 130.

The present disclosure realizes a modular concept for the safety functions in the drive controller 13, allowing for a simple and generic implementation of safety functions by the manufacturer. The safety functions may be extended by the user and adapted to the respective drive in a simple manner.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

The invention claimed is:

1. A drive controller comprising:
   an evaluation unit being configured to receive and evaluate a first item of feedback information from a motor connected to the drive controller;
   a control-signal block connected to secure inputs of the drive controller and being configured to receive condition control signals via the secure inputs and to provide the condition control signals as input signals;
   a drive-signal block connected to the evaluation unit and being configured to calculate a first speed and/or a first position on the basis of the first item of feedback information on at least a first channel and to provide a first speed signal and/or a first position signal;
   a programmable logic unit connected to the control-signal block and to the drive-signal block and being configured to realize the safety functions on the basis of the input signals and the speed signal and/or the position signal in order to provide switch-off signals; and
   an output unit that is connected to the logic unit and to secure outputs of the drive controller and being configured to output switch-off signals on safety-switch-off paths of the drive controller;
   wherein the programmable logic unit comprises the logic modules that were edited by a safety editor and loaded onto the logic unit, wherein a stop function, a speed function, a positional function, an accelerating function and/or a direction-of-rotation function that are each assembled from the logic modules.

2. The drive controller according to claim 1, wherein the drive-signal block comprises a second channel in order to calculate a second speed and/or a second position on the basis of a second item of feedback information from the motor connected to the drive controller and to provide a second speed signal and/or a second position signal.

3. The drive controller according to claim 2, wherein the first item of feedback information is a sensor signal from the motor and the second item of feedback information is an actuating signal for the motor.

4. The drive controller according to claim 2, wherein the two-channel drive-signal block comprises a test-signal module that carries out a validity check of the calculated first and second speed and/or first and second position in order to examine whether the drive controller is in a valid state.

5. The drive controller according to claim 2, wherein the logic unit comprises a test-signal module that carries out a validity check of the calculated first and second speed and/or of the first and second position of the two-channel drive-signal block in order to examine whether the drive controller is in a valid state.

6. The drive controller according to claim 1, wherein the logic unit is configured to communicate with a superordinate safety controller and to exchange data via a safety-oriented protocol.

7. A drive controller comprising:
   an evaluation unit being configured to receive and evaluate a first item and a second item of feedback information from a motor connected to the drive controller;
   a drive-signal block connected to the evaluation unit and being configured to calculate a first speed and/or a first position on the basis of the first item of feedback information on a first channel and provide a first speed signal and/or a first position signal and to calculate a second speed and/or a second position on the basis of the second item of feedback information and provide a second speed signal and/or a second position signal; and
   a test-signal module being configured to carry out a validity check of the calculated first and second speed and/or of the first and second position of the two-channel drive-signal block in order to examine whether the drive controller is in a valid state.

8. The drive controller according to claim 7, further comprising:
   a control-signal block connected to secure inputs of the drive controller and being configured to receive condition control signals and to provide the condition control signals as input signals;
   a programmable logic unit being connected to the drive-signal block and to the control-signal block and being configured to realize safety functions on the basis of the input signals and the speed signals and/or the position signals in order to provide switch-off signals; and an output unit connected to the logic unit and to secure outputs and being configured to output switch-off signals on safety-switch-off paths of the drive controller.

9. The drive controller according to claim 8, wherein the logic unit is configured to communicate with a superordinate safety controller and to exchange data via a safety-oriented protocol.

10. The drive controller according to claim 7, wherein the programmable logic unit comprises logic modules that are edited by a safety editor and loaded onto the logic unit, wherein safety functions are respectively assembled from the logic modules, the safety functions are any of a stop function, a speed function, a positional function, an accelerating function and a direction-of-rotation function.

11. The drive controller according to claim 7, wherein the first item of feedback information is a sensor signal from the motor and the second item of feedback information is an activating signal for the motor.

12. A drive system comprising:
a motor, a drive controller and a superordinate safety controller;
wherein a data-transmission medium having a safety-oriented protocol connects the drive controller to the superordinate safety controller;
wherein the drive controller comprises
an evaluation unit being configured to receive and to evaluate a first item of feedback information from the motor connected to the drive controller;
an input unit which comprises a control-signal block connected to secure inputs of the drive controller an being configured to receive condition control signals from the superordinate safety controller via the secure inputs and to provide the control signals as input signals; and
a drive-signal block connected to the evaluation unit and being configured to calculate a first speed and/or a first position on the basis of the first item of feedback information on at least a first channel and to provide a first speed signal and/or a first position signal;
a programmable logic unit connected to the control-signal block and to the drive-signal block of the input unit and being configured to realize safety functions on the basis of the input signals and the speed signal and/or the position signal in order to provide switch-off signals; and
an output unit that is connected to the logic unit and to the secure outputs of the drive controller and being configured to output switch-off signals on safety-switch-off paths of the drive controller;
wherein the superordinate safety controller comprises a safety editor, wherein logic modules present in a programming environment are edited by the safety editor, wherein the safety functions are a stop function, a speed function, a positional function, an accelerating function and/or a direction-of-rotation function that are each assembled from the logic modules; and
wherein the programmable logic unit comprises the logic modules that were edited by the safety editor and loaded onto the logic unit.

13. The drive system according to claim 12, wherein the drive-signal block comprises a second channel in order to calculate a second speed and/or a second position on the basis of a second item of feedback information from the motor connected to the drive controller and to provide a second speed signal and/or a second position signal.

14. The drive system according to claim 13, wherein the first item of feedback information is a sensor signal from the motor and the second item of feedback information is an actuating signal for the motor.

15. The drive system according to claim 13, wherein the two-channel drive-signal block comprises a test-signal module that carries out a validity check of the calculated first and second speed and/or first and second position in order to examine whether the drive controller is in a valid state.

16. The drive system according to claim 13, wherein the logic unit comprises a test-signal module that carries out a validity check of the calculated first and second speed and/or of the first and second position of the two-channel drive-signal block in order to examine whether the drive controller is in a valid state.

17. The drive system according to claim 12, wherein the logic unit is configured to communicate with a superordinate safety controller and to exchange data via a safety-oriented protocol.

18. The drive system according to claim 12, wherein the output unit comprises an output for a safety brake.

19. The drive system according to claim 18, wherein the safety brake is provided which is connected to the secure outputs of the drive controller.

20. The drive system according to claim 12, wherein the safety functions are configured as a plug-in card for the drive controller.

* * * * *